United States Patent
Izaki et al.

(10) Patent No.: US 7,153,348 B2
(45) Date of Patent: Dec. 26, 2006

(54) HEXAVALENT CHROMIUM-FREE SURFACE-TREATING AGENT FOR SN OR AL-BASED COATED STEEL SHEET, AND SURFACE TREATED STEEL SHEET

(75) Inventors: Teruaki Izaki, Kitakyushu (JP); Masahiro Fuda, Kitakyushu (JP); Mitsuru Nakamura, Tokyo (JP); Katsuyuki Kawakami, Tokyo (JP); Kensuke Mizuno, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/363,866

(22) PCT Filed: Sep. 6, 2001

(86) PCT No.: PCT/JP01/07748

§ 371 (c)(1),
(2), (4) Date: Sep. 2, 2003

(87) PCT Pub. No.: WO02/20874

PCT Pub. Date: Mar. 14, 2002

(65) Prior Publication Data

US 2004/0026667 A1   Feb. 12, 2004

(30) Foreign Application Priority Data

Sep. 7, 2000 (JP) .............................. 2000-271140

(51) Int. Cl.
C23C 22/00 (2006.01)
C23F 11/00 (2006.01)
C09K 5/08 (2006.01)
C09D 5/08 (2006.01)

(52) U.S. Cl. ................................ 106/14.44; 106/14.11; 106/14.12; 106/14.21; 106/14.34; 106/14.39; 148/247; 148/259; 148/262; 148/267; 148/268; 148/275; 428/467; 428/469; 428/471; 428/472

(58) Field of Classification Search ............. 106/14.34, 106/14.39, 14.44, 14.11, 14.12, 14.21; 148/247, 148/259, 262, 267, 268, 275; 428/469, 467, 428/471, 472

See application file for complete search history.

(56) References Cited

U.S. PATENT DOCUMENTS

| 5,188,905 | A | * | 2/1993 | Shindou et al. ............. 428/626 |
| 5,304,401 | A | * | 4/1994 | Shindou et al. ............. 427/410 |
| 5,308,709 | A | * | 5/1994 | Ogino et al. ................ 428/623 |
| 5,700,561 | A | * | 12/1997 | Mano et al. ................ 428/327 |
| 6,447,620 | B1 | * | 9/2002 | Komiyama et al. ......... 148/251 |

FOREIGN PATENT DOCUMENTS

| EP | 0 916 746 | | 5/1999 |
| GB | 2 230 974 | | 11/1990 |
| JP | 58-45396 | | 3/1983 |
| JP | 2-18982 | | 4/1990 |
| JP | 5-106058 | | 4/1993 |
| JP | 06-146002 A | * | 5/1994 |
| JP | 08-60175 A | * | 3/1996 |
| JP | 08-100272 | * | 4/1996 |
| JP | 08-176845 A | * | 7/1996 |
| JP | 08-296054 A | * | 11/1996 |
| JP | 10-168581 | | 6/1998 |
| JP | 11-217682 | | 8/1999 |
| KR | 2000-35781 | | 6/2000 |
| WO | WO 00/32843 | | 6/2000 |
| WO | WO 00 35595 | | 6/2000 |

* cited by examiner

*Primary Examiner*—Anthony J. Green
(74) *Attorney, Agent, or Firm*—Kenyon & Kenyon LLP

(57) ABSTRACT

A hexavalent chromium-free surface treating agent for Sn- or Al-based coated steel sheet, comprising a trivalent chromium compound (A), a water-dispersible silica (B), a lubricity imparting component (C) made of one or more waxes of polyolefin wax, fluorine-containing wax and paraffin wax, and water, a mass ratio on the solid content basis of the water-dispersible silica (B) to the lubricity imparting component (C), (B)/(C), being within a range from 5/95 to 95/5.

16 Claims, No Drawings

HEXAVALENT CHROMIUM-FREE SURFACE-TREATING AGENT FOR SN OR AL-BASED COATED STEEL SHEET, AND SURFACE TREATED STEEL SHEET

BACKGROUND OF THE INVENTION

1. Field of the Invention

The present invention relates to a hexavalent chromium-free surface treating agent whose environmental load is reduced, and a Sn-, Sn alloy-, Al- or Al alloy-coated, surface-treated steel sheet treated with the agent, which is used in a fuel tank or an exhaust system of automobiles, or in building materials.

2. Description of the Related Art

Not only the weldability, but also general corrosion resistance on the outside and anti-fuel corrosion resistance on the inside, is required of materials for fuel tanks of automobiles using gasoline as a fuel. Heretofore, Pb—Sn based coated steel sheets obtained by terne coating have commonly been used as materials for fuel tank. However, with regard to environmental problems, regulation of Pb has become severe. The use of alcohol-containing fuels such as a gasoline/alcohol mixed fuel (including M15 containing about 15% by mass of methanol and M85 containing about 85% by mass of methanol) called gasohols have recently been promoted in some countries by exhaust gas regulation after taking environmental problems into consideration. However, since conventional terne coated sheets are liable to be corroded by the alcohol-containing fuels described above, it is of urgent necessity to develop materials for fuel tanks, which are superior in anti-fuel corrosion to alcohol-containing fuels. Due to this tendency, various products including hot-dip aluminized steel sheet, hot-dip Sn—Zn coated steel sheet and the like have been developed as materials for Pb-free automobile fuel tanks.

Japanese Unexamined Patent Publication (Kokai) No. 58-45396 discloses a surface treated steel sheet for fuel tanks obtained by subjecting a steel sheet having a Zn—Ni alloy layer (Ni content: 5 to 50% by mass, a thickness of 0.5 to 20 µm) to a chromate treatment. Japanese Unexamined Patent Publication No. 5-106058 discloses a surface treated steel sheet for fuel tank obtained by subjecting a steel sheet having a Zn—Ni alloy coating (Ni content: 8 to 20% by mass) in a coating mass of 10 to 60 g/m$^2$, to a chromate treatment containing hexavalent chromium. Japanese Unexamined Patent Publication Nos. 10-168581 and 11-217682 disclose materials obtained by subjecting hot-dip aluminized materials to a chromate treatment. As described above, almost all the products which are intended to replace terne coating are products with an outermost layer containing hexavalent chromium obtained by a chromate treatment.

As is well known, hexavalent chromium is a harmful and unfavorable substance because it exhibits carcinogenicity to the human body, has possibility of elution from products and causes problems in waste treatment. Although some products are treated with trivalent chromium as electrolytic chromate, these products use hexachromium during manufacture and are the same as conventional products in that the waste treatment must be conducted. However, there is no appropriate treatment exhibiting a performance which can be used in place of chromate treatment, at present.

As a matter of course, various studies of surface treating agents using no hexavalent chromium have been made. For example, Japanese Examined Patent Publication (Kokoku) No. 2-18982 discloses a surface treated steel sheet, for fuel tanks, comprising a plating layer, as a lower layer, which is made of Zn or contains Zn as a main component, and an upper layer containing a metal powder of a 10% or more Cr-containing stainless steel, Zn, Al, Mg, Ni and Sn in a phenoxy resin and a rubber-modified epoxy resin as main components. However, since the resistance weldability such a spot weldability and seam weldability is required to the use in fuel tank, a treatment which forms a thick organic coating cannot satisfy the requirement.

SUMMARY OF THE INVENTION

The present inventors have intensively studied means for solving the problems of the prior art and found that the problems can be solved by using an aqueous metal surface treating agent containing a trivalent chromium compound, a water-dispersible silica and a lubricity imparting agent, thus completing the present invention.

The present invention provides a hexavalent chromium-free surface-treating agent for Sn-based or Al-based coated steel sheet, comprising a trivalent chromium compound (A), a water-dispersible silica (B), a lubricity imparting component (C) made of one or more waxes of polyolefin wax, fluorine-containing wax and paraffin wax, and water, a mass ratio on the solid content basis of the water-dispersible silica (B) to the lubricity imparting component (C), (B)/(C), being within a range from 5/95 to 95/5. The mass of the solid content of the component (B) is within a range from 10 to 90% by mass based on 100% by mass of the total solid content of the surface treating agent.

Preferably, the hexavalent chromium-free surface-treating agent for Al-based coated steel sheet further contains a metal nitrate (D) as an additional component, the metal in the metal nitrate being at least one selected from the group consisting of alkali earth metals, Co, Ni, Fe, Zr and Ti. Preferably, it further contains a water-soluble resin (E) as an additional component. Preferably, it further contains phosphonic acid or a phosphonic acid compound (F) as an additional component. The present invention also provides a surface treated, Sn-based or Al-based coated steel sheet having a coating in a dry coating mass within a range from 0.01 to 5 g/m$^2$, which is obtained by coating the surface treating agent of the present invention on the Sn- or Sn alloy-based or Al- or Al alloy-based coated surface and drying the surface treating agent.

DESCRIPTION OF PREFERRED EMBODIMENTS

The constitution of the present invention will now be described in detail.

The first feature of the present invention resides in containing a trivalent chromium compound as a component (A). Examples of the trivalent chromium compound include, but are not limited to, chromic (III) sulfate, chromic (III) nitrate, chromic (III) biphosphate, chromic (III) fluoride, and chromic (III) halide. The amount of the component (A) to be incorporated into the aqueous metal surface treating agent of the present invention is not specifically limited.

The water-dispersible silica, as the component (B), used in the present invention includes, for example, colloidal silica and vapor-phase produced silica. Examples of the colloidal silica include, but are not limited to, SNOWTEX C, SNOWTEX O, SNOWTEX N, SNOWTEX S, SNOWTEX UP, SNOWTEX PS-M, SNOWTEX PS-L, SNOWTEX 20, SNOWTEX 30, and SNOWTEX 40 (all of which are manufactured by NISSAN CHEMICAL INDUSTRIES, LTD.). Examples of the vapor-phase silica include, but are not limited to, AEROSIL 50, AEROSIL 130, AEROSIL 200, AEROSIL 300, AEROSIL 380, AEROSIL TT600, AEROSIL MOX80, and AEROSIL 170 (all of which are manufactured by NIPPON AEROSIL CO., LTD.).

The lubricity imparting component, as the component (C), used in the present invention has an action of reducing a friction coefficient of the surface by using one or more kinds of polyolefin wax, fluorine-containing wax and paraffin wax, thereby to impart the lubricity and to prevent galling, thus improving press-formability and ironing workability. The lubricity imparting agent may be any one capable of imparting the lubricity to the resulting coating and is preferably made of one or more kinds of polyolefin wax such as polyethylene or polypropylene wax; fluorine-containing such as polytetrafluoroethylene, polychlorotrifluororethylene, polyvinylidene fluoride or polyvinyl fluoride wax; and paraffin wax.

The mass ratio (B)/(C) of the component (B) to the component (C) is within a range from 5/95 to 95/5, and preferably from 70/30 to 90/10. When the mass ratio (B)/(C) is less than 5/95 or exceeds 95/5, the level of the press-formability and ironing workability is insufficient and, therefore, it is not preferred.

The solid content of the component (B) is preferably within a range from 10 to 90% by mass, and more preferably from 20 to 80% by mass, based on 100% by mass of the total solid content of the components (A) to (C). When the solid content of the component (B) is less than 10% by mass based on 100% by mass of the total solid content of the components (A) to (C), the resulting coating is inferior in corrosion resistance and coatability and, therefore, it is not preferred. On the other hand, when the solid content of the component (B) exceeds 90% by mass based on 100% by mass of the total solid content of the components (A) to (C), the corrosion resistance is lowered because the absolute amount of the component (A), which is effective for corrosion resistance, is reduced and, therefore, it is not preferred.

A metal nitrate (D) as an additional component is preferably incorporated to further improve the corrosion resistance, and the metal of the metal nitrate (D) is not specifically limited but is preferably at least one selected from the group consisting of alkali earth metals, Co, Ni, Fe, Zr and Ti.

To further improve the corrosion resistance and paintability, a water-soluble resin (E), as an additional component, can be incorporated. The water-soluble resin (E) is not specifically limited, but is preferably a water-soluble acrylic resin, and examples of the water-soluble acrylic resin include polymers of acrylic acid, methacrylic acid, polyacrylic acid and polymethacrylic acid, and copolymers thereof with a vinyl compound (e.g. styrene, acrylonitrile, etc.) copolymerizable with the above monomer.

The solid content of the component (E) is preferably within a range from 0.1 to 10% by mass, and more preferably from 0.5 to 5% by mass, based on 100% by mass of the total solid content of the components (A) to (E). When the solid content of the component (E) is less than 0.1% by mass based on 100% by mass of the total solid content of the components (A) to (E), the effect of improving the corrosion resistance and paintability is poor. On the other hand, when the solid content exceeds 10% by mass based on 100% by mass, it is not economic, because the effect of improving the corrosion resistance is saturated, and the weldability is lowered. Therefore, it is not preferred.

The corrosion resistance and paintability can be further improved by incorporating phosphonic acid or a phosphonic acid compound (F) as an additional component. Examples of the phosphonic acid compound include, but are not limited to, methyldiphosphonic acid, aminotris(methylenephosphonic acid), ethylidenephosphonic acid, 1-hydroxyethylidene-1,1-diphosphonic acid, 1-hydroxypropylidene-1,1-diphosphonic acid, 1-hydroxybutylidene-1,1-diphosphonic acid, ethylaminobis(methylenephosphonic acid), dodecylaminobis(methylenephosphonic acid), nitrilotris(methylenephosphonic acid), ethylenediaminebis(methylenephosphonic acid), ethylenediaminetetrakis(methylenephosphonic acid), hexenediaminetetrakis(methylenephosphonic acid), and diethylenetriaminepenta(methylenephosphonic acid); and, ammonium and alkali metal salts (excluding Na salt) of the above phosphonic acids; and other chelating agents having one or more phosphonic acid groups or salts thereof. Oxides thereof include N-oxides obtained by oxidizing such phosphonic acid chelating agents having a nitrogen atom in a molecule thereof.

The solid content of the component (F) is preferably within a range from 0.1 to 20% by mass, and more preferably from 1 to 10% by mass, based on 100% by mass of the total solid content of the components (A) to (F). When the solid content of the component (F) is less than 1% by mass based on 100% by mass of the total solid content of the components (A) to (F), the effect of improving the corrosion resistance is poor. On the other hand, when the solid content exceeds 20% by mass based on 100% by mass, it is not economic, because the effect of improving the corrosion resistance is saturated, and the paintability is lowered. Therefore, it is not preferred.

The surface treated steel sheet of the present invention is characterized in that the surface treating agent of the present invention is coated and dried on a Sn-, Sn alloy-, Al- or Al alloy-coated surface to form a coating in a dry coating mass within a range from 0.01 to 5 g/m$^2$. When the dry coating mass is less than 0.01 g/m$^2$, the formability and the corrosion resistance are insufficient and, therefore, it is not preferred. On the other hand, when the coating mass exceeds 5 g/m$^2$, it is not economic, because the effect of improving the formability and the corrosion resistance is saturated, and the paintability and the weldability are lowered. Therefore, it is not preferred.

Examples of the material for fuel tank, which is suited for use in the present invention, include Sn, Sn-alloy, Al and Al-alloy.

In case of the Sn-based coating (Sn- or Sn alloy-coating), it preferably contains one or more of Zn: 0.1–50% and Mg: 0.1–10%. Although Zn is added mainly to impart a sacrificial corrosion protection action to a coating layer, Zn also has the effect of inhibiting the occurrence of whiskers which are likely to occur when coated with only Sn. When Zn is added in a small amount of 0.1%, the effect of inhibiting the occurrence of whiskers is exerted. When the amount of Zn increases, white rust occurs more frequently. When the amount of Zn exceeds 50%, white rust appears significantly and, therefore, this value of Zn is taken as an upper limitation. Examples of the impurity element include a trace amount of Fe, Ni, Co, etc. When Mg is added, an effect of improving the corrosion resistance is exerted. If necessary, Al, misch metal, Sb, etc. may be added.

In case of the Al-based coating (Al- or Al alloy coating), it preferably contains Si: 3–15% by mass. Si is added to inhibit excess growth of an alloy layer which causes a problem in case of an Al-based coated steel sheet. When the amount of Si is less than 3% by mass, the corrosion resistance after forming is lowered because of excess growth of the alloy layer, thereby lowering the corrosion resistance. If the amount of Si increases too much, large primary crystals of Si are formed, thereby to lower the corrosion resistance. When the amount of Si exceeds 15%, white rust tends to appear and, therefore, this value of Si is taken as an upper limitation. Examples of the impurity element include a small amount of Fe, Ni, Co, etc. When Mg is added in an amount of 0.1 to 15%, the effect of further improving the corrosion resistance is exerted. $Mg_2Si$ is formed in the coating layer by adding both Si and Mg and the corrosion resistance is remarkably improved by the elution effect thereof. If necessary, Sn, misch metal and Sb may be added. The corrosion resistance of the edge faces of the aluminized steel sheet can be improved by further adding 0.1 to 50% of Zn.

Although the aluminized coating layer is electropotentially noble to a steel sheet (does not exert a sacrificial corrosion protection action an the occurrence of red rust of a steel sheet), the potential of the Al coating layer can be made base as compared with the steel sheet by adding Zn, thus making it possible to inhibit red rust from occurring at the edge faces of the steel sheet. When the amount is less than 0.1%, the above effect is not exerted. On the other hand, when the amount exceeds 50%, the above effect is saturated and the heat resistance of the aluminized steel sheet is deteriorated to the contrary.

The surface treating agent of the present invention is preferably coated after cleansing the surface of these materials to be coated by alkali degreasing, pickling and/or the like.

Although the method of coating the surface treating agent is not specifically limited, a roll coating method, a dipping method, an electrostatic coating method or the like can be used. After coating, the surface treating agent is preferably dried at a PMT (peak metal temperature) within a range from 60 to 200° C.

EXAMPLES

The present invention will be described in detail by way of the following Examples and Comparative Examples. These Examples described herein are illustrative and not restrictive.

[Production of Test Sheet]

(1) Test Material (Production of Sn—Zn Coated Steel Sheet)

A steel containing the components as shown in Table 1 was melted by a conventional steel convertor-vacuum degassing process to form a slab, which was hot-rolled, cold-rolled and then continuously annealed under conventional conditions to obtain an annealed steel sheet (0.8 mm thick). The resulting steel sheet was subjected to Sn—Zn coating or Sn—Zn—Mg coating. Coating was conducted by various methods such as a fused flux method, vapor phase plating method and the like. The content of Zn varied within a range from 0 to 55%, while the content of Mg varied within a range from 0 to 12%. The coating mass was adjusted to about 40 g/m².

TABLE 1

| Components (% by mass) of original sheet to be coated | | | | |
|---|---|---|---|---|
| C | Si | Mn | P | S |
| 0.0022 | 0.08 | 0.31 | 0.008 | 0.010 |
| Ti | Nb | Al | B | N |
| 0.033 | 0.001 | 0.05 | 0.0005 | 0.0031 |

(Production of Aluminized Steel Sheet)

A steel containing the components as shown in Table 1 was molten by a conventional steel convertor-vacuum degassing process to form a slab, which was hot-rolled and then cold-rolled under conventional conditions to obtain a 0.8 mm thick steel sheet. The resulting steel sheet was subjected to Al—Si coating, Al—Si—Mg coating and Al—Si—Mg—Zn coating in a NOF-RF type hot-dip coating line and the compositions of the coatings were varied. Furthermore, a steel sheet annealed after cold rolling was subjected to Al—Mg coating using the vapor phase plating and fused-salt plating method. The coating mass was adjusted to about 40 g/m². These coated steel sheets thus obtained were used as test materials of aluminized steel sheets.

(2) Degreasing Treatment

Each of test materials described above was degreased with a silicate-based alkali degreasing agent, FINE CLEANER™ 4336 (manufactured by NIHON PARKERIZING CO., LTD.), (concentration: 20 g/L, temperature: 60° C., spraying for 20 seconds), and then washed with tap water.

(3) Preparation of Surface Treating Agent

A trivalent chromium compound in Table 2, a water-dispersible silica in Table 3, a lubricity imparting agent in Table 4, a metal nitrate in Table 5, an aqueous resin in Table 6 and phosphonic acid or a phosphonic acid compound in Table 7 were sequentially put in distilled water at room temperature and then mixed with stirring using a propeller stirrer to prepare a surface treating agent. Surface treating agents of Examples are shown in Table 8 and surface treating agents of Comparative Examples are shown in Table 9.

(4) Coating of Surface Treating Agent

Each surface treating agent thus prepared was coated on each test sheet by using a bar coater and then dried at 240° C. as a furnace temperature. The coating mass (g/m²) was controlled by appropriately adjusting the solid content of the surface treating agent.

TABLE 2

| Trivalent chromium compounds used in Examples and Comparative Examples | | |
|---|---|---|
| | Compounds | Solid content |
| A1 | Aqueous chromium fluoride solution | 10% |
| A2 | Aqueous chromium phosphate solution | 10% |
| A3 | Solution of 30% reduced hexavalent chromium* | 10% |

*Control Example

TABLE 3

| Water-dispersible silicas used in Examples and Comparative Examples | | |
|---|---|---|
| | Compounds | Solid content |
| B1 | SNOWTEX O diluted solution | 10% |
| B2 | Water dispersion of AEROSIL 200 | 10% |

TABLE 4

Lubricity imparting agents used in Examples and Comparative Examples

| | Compounds | Softening point | Average particle diameter |
|---|---|---|---|
| C1 | Low-density polyethylene wax | 110° C. | 0.6 μm |
| C2 | Low-density polyethylene wax | 110° C. | 1.0 μm |
| C3 | PTFE wax | — | 2.0 μm |
| C3 | Synthetic paraffin wax | 105° C. | 3.0 μm |

TABLE 7

Phosphonic acid and phosphonic acid compound used in Examples and Comparative Examples

| | Compounds | Concentration |
|---|---|---|
| F1 | Aminotrimethylenephosphonic acid | 50% |
| F2 | 1-hydroxyethylidene-1,1-diphosphobic acid | 60% |

TABLE 8

Surface treating agent of Examples (total solid content: 5%)

Solid content component of surface treating agent*1

| Examples | Trivalent chromium compound (A) | Water-dispersible silica (B) | Lubricity imparting agent (C) | Metal nitrate (D) | Water-soluble resin (E) | Phosphonic acid compound (F) | (B)/(C)*2 |
|---|---|---|---|---|---|---|---|
| 1 | A1 (25) | B1 (37) | C1 (15) | D1 (10) | E1 (3) | F1 (10) | 37/15 |
| 2 | A2 (25) | B1 (45) | C1 (10) | D1 (10) | E1 (2) | F1 (8) | 45/10 |
| 3 | A1 (10) | B1 (55) | C2 (8) | D2 (10) | E2 (2) | F2 (15) | 55/8 |
| 4 | A1 (10) | B1 (50) | C3 (20) | D3 (10) | E3 (2) | F2 (8) | 5/2 |
| 5 | A1 (10) | B2 (70) | C2 (5) | D1 (10) | E1 (2) | F1 (3) | 70/5 |
| 6 | A1 (20) | B1 (40) | C1 (20) | D1 (10) | E1 (5) | F1 (5) | 2/1 |
| 7 | A1 (20) | B1 (47) | C1 (20) | None | E1 (3) | F1 (10) | 47/20 |
| 8 | A1 (20) | B1 (52) | C1 (10) | D1 (10) | None | F1 (8) | 52/10 |
| 9 | A1 (30) | B1 (38) | C4 (20) | D1 (10) | E1 (2) | None | 38/20 |
| 10 | A1 (25) | B1 (52) | C1 (5) | None | None | F1 (18) | 52/5 |
| 11 | A1 (15) | B1 (50) | C2 (25) | D1 (10) | None | None | 2/1 |
| 12 | A1 (10) | B1 (60) | C1 (15) | None | E1 (5) | None | 4/1 |
| 13 | A2 (20) | B2 (60) | C1 (20) | None | None | None | 3/2 |

*1: each numerical value in parenthesis denotes mass % of the solid content based on 100% by mass of the total solid content of the surface treating agent.
*2: mass ratio of component (B) to metal in the component (C).

TABLE 5

Metal nitrates used in Examples and Comparative Examples

| | Compounds | Solid content |
|---|---|---|
| D1 | Agueous cobalt nitrate solution | 10% |
| D2 | Aqueous calcium nitrate solution | 10% |
| D3 | Aqueous zinc nitrate solution | 10% |

TABLE 6

Water-soluble resins used in Examples and Comparative Examples

| | Compounds | Remarks | Concentration |
|---|---|---|---|
| E1 | Polyacrylic acid diluted solution | MW: 20,000–40,000 | 5% |
| E2 | Polyacrylic acid diluted solution | MW: 100,000–200,000 | 5% |
| E3 | Polymethacrylic acid diluted solution | MW: 100,000–200,000 | 5% |

MW: molecular weight (weight average)

[Evaluation Items and Evaluation Procedures of Performances]

(1) Formability Test

A draw bead test was conducted to evaluate the formability. Using a die (bead radius: 4R, die shoulder radius: 2R), each test piece was pressed at a hydraulic pressure force of 1000 kg. The test sample had a width of 30 mm and the state of damage caused by the bead portion was visually observed in the cross-section by a microscope (magnification: ×400). The length observed was 20 mm and occurrence of cracks in the plating layer was evaluated.

[Evaluation Criteria]
○: formable, no defects of coating layer
Δ: formable, cracks occurred in coating layer
X: formable, peeling occurred locally in coating layer (2) Corrosion Resistance Test Using a hydraulic forming tester, each sample having a diameter of 30 mm and a depth of 20 mm obtained by cupping (deep-drawing into a flat-bottomed cylinder) was evaluated by the automobile parts appearance corrosion test method defined in JASO (Japanese Automobile Standards Organization) M610-92.

[Evaluation Conditions]
Test period: 140 cycles (46 days)

[Evaluation Criteria]
⊚: occurrence ratio of red rust is less than 0.1%

○: occurrence ratio of red rust is 0.1% or more and less than 1%, or white rust is present Δ: occurrence ratio of red rust is 1% or more and less than 5%, or white rust are apparently seen X: occurrence ratio of red rust is 5% or more, or significant white rust (3) Weldability Under the following welding conditions, spot welding was conducted and the number of continuous spots were counted until the nugget diameter is reduced to $4\sqrt{t}$ or less. In case of one surface coating, evaluation (t: steel thickness) was conducted so that the resin surface corresponds to the inside in one steel sheet, while the resin surface corresponds to the outside in the other steel sheet.

[Welding Condition]
Welding current: 10 kA
Pressure force: 240 kg
Welding time: 12 cycles (60 Hz)
Electrode: dome-shape electrode, tip diameter of 6 mm

[Evaluation Criteria]

⊚: number of continuous spots exceeds 900

○: number of continuous spots is from 700 to 900

Δ: number of continuous spots is from 500 to 700

X: number of continuous spots is less than 500

(4) Paintability

Each 70 mm×150 mm test piece was spray-coated. ACRIE TK BLACK (manufactured by YUKOSHA CO.) was used as a coating composition. The coating thickness was 20 μm and the baking time was 20 minutes at 140° C. The test piece was cross-cut and dipped in an aqueous 5% NaCl solution at 55° C. for 10 days. After the test piece was taped, a peeling width of the coating composition was determined to evaluate secondary adhesion of the coating composition.

[Evaluation Criteria]

○: peeling width is not more than 5 mm

Δ: peeling width exceeds 5 mm and not more than 7 mm

X: peeling width exceeds 7 mm

TABLE 9

Surface treating agent of Comparative Examples (total solid content: 10%)

| | Solid content component of surface treating agent*1 | | | | | | |
|---|---|---|---|---|---|---|---|
| Comp. Examples | Trivalent chromium compound (A) | Water-dispersible silica (B) | Lubricity imparting agent (C) | Metal nitrate (D) | Water-soluble resin (E) | Phosphonic acid compound (F) | Remarks |
| 1 | A3 (10) | B1 (40) | C1 (20) | D1 (10) | E1 (8) | F1 (12) | containing hexavalent chromium |
| 2 | A2 (40) | none | C1 (20) | D1 (10) | E1 (10) | F1 (20) | containing no silica |
| 3 | A1 (10) | B1 (50) | none | D2 (10) | E2 (10) | F2 (20) | containing no lubricity imparting agent |
| 4 | none | B1 (60) | C1 (10) | D3 (15) | E3 (5) | F3 (10) | containing no trivalent chromium |
| 5 | A1 (20) | B2 (60) | C2 (2) | D1 (8) | E1 (5) | F1 (5) | *3 not within a range of a ratio (B)/(C) |

*1: each numerical value in parenthesis denotes mass % of the solid content based on 100% by mass of the total solid content of the surface treating agent
*3: mass ratio of component (B) to metal in the component (C), (B)/(C) = 99/1

TABLE 10

Test level and coating film performances of Examples

| | | Surface treating agent | | | coating film performances | | | | |
|---|---|---|---|---|---|---|---|---|---|
| No. | Kind of plating | Kind (Table 8) | Coating mass*2 (g/m²) | Peak metal temperature (° C.) | Formability | Corrosion resistance | Weldability | Paintability | Free from hexavalent chromium |
| 1 | Sn-0.1% Zn | No. 1 | 0.05 | 80 | ○ | ⊚ | ○ | ○ | ○ |
| 2 | Sn-8% Zn | No. 2 | 0.10 | 80 | ○ | ⊚ | ⊚ | ○ | ○ |
| 3 | Sn-8% Zn-2% Mg | No. 3 | 0.20 | 80 | ○ | ⊚ | ⊚ | ○ | ○ |
| 4 | Sn-1% Zn-10% Mg | No. 5 | 0.10 | 100 | ○ | ⊚ | ⊚ | ○ | ○ |
| 5 | Sn-2% Mg | No. 7 | 1.00 | 100 | ○ | ⊚ | ⊚ | ○ | ○ |
| 6 | Sn-50% Zn-1% Mg | No. 8 | 0.01 | 80 | ○ | ○ | Δ | ○ | ○ |
| 7 | Sn-8% Zn-0.1% Mg | No. 11 | 0.20 | 80 | ○ | ○ | ⊚ | ○ | ○ |
| 8 | Sn-0.1% Mg | No. 13 | 5.00 | 70 | ○ | ⊚ | Δ | ○ | ○ |
| 9 | Al-8% Si | No. 1 | 0.20 | 70 | ○ | ⊚ | ⊚ | ○ | ○ |

TABLE 10-continued

Test level and coating film performances of Examples

| | | Surface treating agent | | | coating film performances | | | | |
|---|---|---|---|---|---|---|---|---|---|
| No. | Kind of plating | Kind (Table 8) | Coating mass*2 (g/m²) | Peak metal temperature(° C.) | Formability | Corrosion resistance | Weldability | Paintability | Free from hexavalent chromium |
| 10 | Al-8% Si-6% Mg | No. 3 | 0.10 | 80 | ○ | ◎ | ○ | ○ | ○ |
| 11 | Al-8% Si-10% Mg | No. 4 | 0.50 | 80 | ○ | ◎ | ◎ | ○ | ○ |
| 12 | Al-8% Si-6% Mg 10% Zn | No. 6 | 0.20 | 80 | ○ | ◎ | ◎ | ○ | ○ |
| 13 | Al-50% Zn-6% Mg | No. 9 | 0.01 | 90 | Δ | ○ | ○ | ○ | ○ |
| 14 | Al-8% Si-0.5% Mg | No. 10 | 0.10 | 90 | ○ | ○ | ○ | ○ | ○ |
| 15 | Al-3% Si-6% Mg | No. 11 | 0.20 | 80 | ○ | ◎ | ◎ | ○ | ○ |
| 16 | Al-8% Si-25% Zn | No. 12 | 3.00 | 80 | ○ | ◎ | Δ | ○ | ○ |
| 17 | Al-45% Zn-3% Mg | No. 13 | 0.50 | 100 | ○ | ◎ | ◎ | ○ | ○ |

*2: Mass of dry film

TABLE 11

Test level and coating film performances of Comparative Examples

| | | Surface treating agent | | | coating film performances | | | | |
|---|---|---|---|---|---|---|---|---|---|
| No. | Kind of plating | Kind (Table 9) | Coating mass*2 (g/m²) | Peak metal temperature(° C.) | Formability | Corrosion resistance | Weldability | Paintability | Free from hexavalent chromium |
| 1 | Sn-8% Zn | No. 1 | 0.5 | 80 | ○ | ○ | ◎ | ○ | X |
| 2 | Sn-8% Zn-1% Mg | No. 2 | 0.2 | 80 | ○ | ○ | ◎ | X | ○ |
| 3 | Sn-0.05% Mg | No. 5 | 0.02 | 80 | ○ | X | Δ | ○ | ○ |
| 4 | Al-8% Si | No. 3 | 0.2 | 80 | X | ○ | ◎ | ○ | ○ |
| 5 | Al-8% Si | No. 4 | 1.0 | 80 | X | X | ○ | X | ○ |
| 6 | Al-8% Si-6% Mg-20% Zn | No. 5 | 0.5 | 80 | X | ○ | ○ | ○ | ○ |

*2: Mass of dry film

As described above, it is apparent that the coating formed by coating and drying the surface treating agent of the present invention has very significant industrial applicability because it is superior in formability, corrosion resistance, weldability and paintability and is free from hexavalent chromium which is harmful to the human body and the environment. Although the surface treating agent was described with respect to use in fuel tanks, the surface treating agent can be used in the exhaust system and building materials. It has been confirmed that the surface treating agent can be satisfactorily used in appliances, in addition to the fuel tank, in the case of Sn-based coating.

The invention claimed is:

1. A hexavalent chromium-free surface treating agent for Sn-based or Al-based plated steel sheet, comprising a trivalent chromium compound (A), a water-dispersible silica (B), a lubricity imparting component (C) of one or more of polyolefin wax, fluorine-containing wax and paraffin wax, and water, the mass ratio on a solid content basis, of the water-dispersible silica (B) to the lubricity imparting component (C), (B)/(C), being within a range from 5/95 to 95/5, and a metal nitrate (D), with the metal in the metal nitrate being at least one selected from the group consisting of alkali earth metals, Co, Ni, Fe, Zr and Ti, wherein said surface treating agent is hexavalent chromium-free.

2. The hexavalent chromium-free surface treating agent for Sn-based or Al-based plated steel sheet according to claim 1, wherein the solid content of the component (B) is within a range from 10 to 90% by mass based on 100% by mass of the total solid content of the surface treating agent.

3. A hexavalent chromium-free surface treating agent for Sn-based or Al-based plated steel sheet, comprising a trivalent chromium compound (A), a water-dispersible silica (B), a lubricity imparting component (C) of one or more of polyolefin wax, fluorine-containing wax and paraffin wax, and water, the mass ratio on a solid content basis, of the water-dispersible silica (B) to the lubricity imparting component (C), (B)/(C), being within a range from 5/95 to 95/5, and a water-soluble resin (E), wherein said surface treating agent is hexavalent chromium-free.

4. The hexavalent chromium-free surface treating agent for Sn-based or Al-based plated steel sheet according to claim 3, wherein the solid content of the component (B) is within a range from 10 to 90% by mass based on 100% by mass of the total solid content of the surface treating agent.

5. A hexavalent chromium-free surface treating agent for Sn-based or Al-based plated steel sheet, comprising a trivalent chromium compound (A), a water-dispersible silica (B), a lubricity imparting component (C) of one or more of polyolefin wax, fluorine-containing wax and paraffin wax, and water, the mass ratio on a solid content basis, of the water-dispersible silica (B) to the lubricity imparting component (C), (B)/(C), being within a range from 5/95 to 95/5, and phosphonic acid or a phosphonic acid compound (F), wherein said surface treating agent is hexavalent chromium-free.

6. The hexavalent chromium-free surface treating agent for Sn-based or Al-based plated steel sheet according to claim 5, wherein the solid content of the component (B) is within a range from 10 to 90% by mass based on 100% by mass of the total solid content of the surface treating agent.

7. A hexavalent chromium-free surface-treated Sn-based or Al-based plated steel sheet, comprising an Sn-based or Al-based plated steel sheet and a coating, in a dry coating mass within a range from 0.01 to 5 g/m² formed on the plated steel sheet, said coating containing a trivalent chromium compound (A), a water-dispersible silica (B) and a lubricity imparting component (C) of one or more of polyolefin wax, fluorine-containing wax and paraffin wax, a mass ratio on the solid content basis of the water-dispersible silica (B) to the lubricity imparting component (C), (B)/(C), being within a range from 5/95 to 95/5, and a metal nitrate (D), with the metal in the metal nitrate being at least one selected from the group consisting of alkali earth metals, Co, Ni, Fe, Zr and Ti, wherein said coating is hexavalent chromium-free.

8. The hexavalent chromium-free surface-treated Sn-based or Al-based plated steel sheet according to claim 7, wherein the solid content of the component (B) is within a range from 10 to 90%, by mass, based on 100%, by mass, of the mass of the coating.

9. A hexavalent chromium-free surface-treated Sn-based or Al-based plated steel sheet, comprising an Sn-based or Al-based plated steel sheet and a coating, in a dry coating mass within a range from 0.01 to 5 g/m² formed on the plated steel sheet, said coating containing a trivalent chromium compound (A), a water-dispersible silica (B) and a lubricity imparting component (C) of one or more of polyolefin wax, fluorine-containing wax and paraffin wax, a mass ratio on the solid content basis of the water-dispersible silica (B) to the lubricity imparting component (C), (B)/(C), being within a range from 5/95 to 95/5, and a water-soluble resin (E), wherein said coating is hexavalent chromium-free.

10. The hexavalent chromium-free surface-treated Sn-based or Al-based plated steel sheet according to claim 9, wherein the solid content of the component (B) is within a range from 10 to 90%, by mass, based on 100%, by mass, of the mass of the coating.

11. A hexavalent chromium-free surface-treated Sn-based or Al-based plated steel sheet, comprising an Sn-based or Al-based plated steel sheet and a coating, in a dry coating mass within a range from 0.01 to 5 g/m² formed on the plated steel sheet, said coating containing a trivalent chromium compound (A), a water-dispersible silica (B) and a lubricity imparting component (C) of one or more of polyolefin wax, fluorine-containing wax and paraffin wax, a mass ratio on the solid content basis of the water-dispersible silica (B) to the lubricity imparting component (C), (B)/(C), being within a range from 5/95 to 95/5, and phosphonic acid or a phosphonic acid compound (F), wherein said coating is hexavalent chromium-free.

12. The hexavalent chromium-free surface-treated Sn-based or Al-based plated steel sheet according to claim 11, wherein the solid content of the component (B) is within a range from 10 to 90%, by mass, based on 100%, by mass, of the mass of the coating.

13. A hexavalent chromium-free surface-treated Sn-based plated steel sheet, comprising an Sn-based plated steel sheet, wherein an Sn or Sn alloy plating layer of the Sn-based plating is composed, by mass, of one or more of Zn: 0.1–50% and Mg: 0.1–10%, the balance being Sn and unavoidable impurities, and a coating, in a dry coating mass within a range from 0.01 to 5 g/m² formed on the plated steel sheet, said coating containing a trivalent chromium compound (A), a water-dispersible silica (B) and a lubricity imparting component (C) of one or more of polyolefin wax, fluorine-containing wax and paraffin wax, a mass ratio on the solid content basis of the water-dispersible silica (B) to the lubricity imparting component (C), (B)/(C), being within a range from 5/95 to 95/5, wherein said coating is hexavalent chromium-free.

14. The hexavalent chromium-free surface-treated Sn-based plated steel sheet according to claim 13, wherein the solid content of the component (B) is within a range from 10 to 90%, by mass, based on 100%, by mass, of the mass of the coating.

15. A hexavalent chromium-free surface-treated Al-based plated steel sheet, comprising an Al-based plated steel sheet, wherein an Al or Al alloy plating layer of the Al-based plating is composed by mass, of one or more of Si: 3–15%; Mg: 0.1–15% and Zn: 0.1–50%, the balance being Al an unavoidable impurities, and a coating, in a dry coating mass within a range from 0.01 to 5 g/m2 formed on the plated steel sheet, said coating containing a trivalent chromium compound (A), a water-dispersible silica (B) and a lubricity imparting component (C) of one or more of polyolefin wax, fluorine-containing wax and paraffin wax, a mass ratio on the solid content basis of the water-dispersible silica (B) to the lubricity imparting component (C), (B)/(C), being within a range from 5/95 to 95/5, wherein said coating is hexavalent chromium-free.

16. The hexavalent chromium-free surface-treated Al-based plated steel sheet according to claim 15, wherein the solid content of the component (B) is within a range from 10 to 90%, by mass, based on 100%, by mass, of the mass of the coating.

* * * * *